C. O. EGERTON.
GASOLENE GAGE.
APPLICATION FILED JAN. 8, 1914.
1,109,669.
Patented Sept. 8, 1914.
2 SHEETS—SHEET 1.
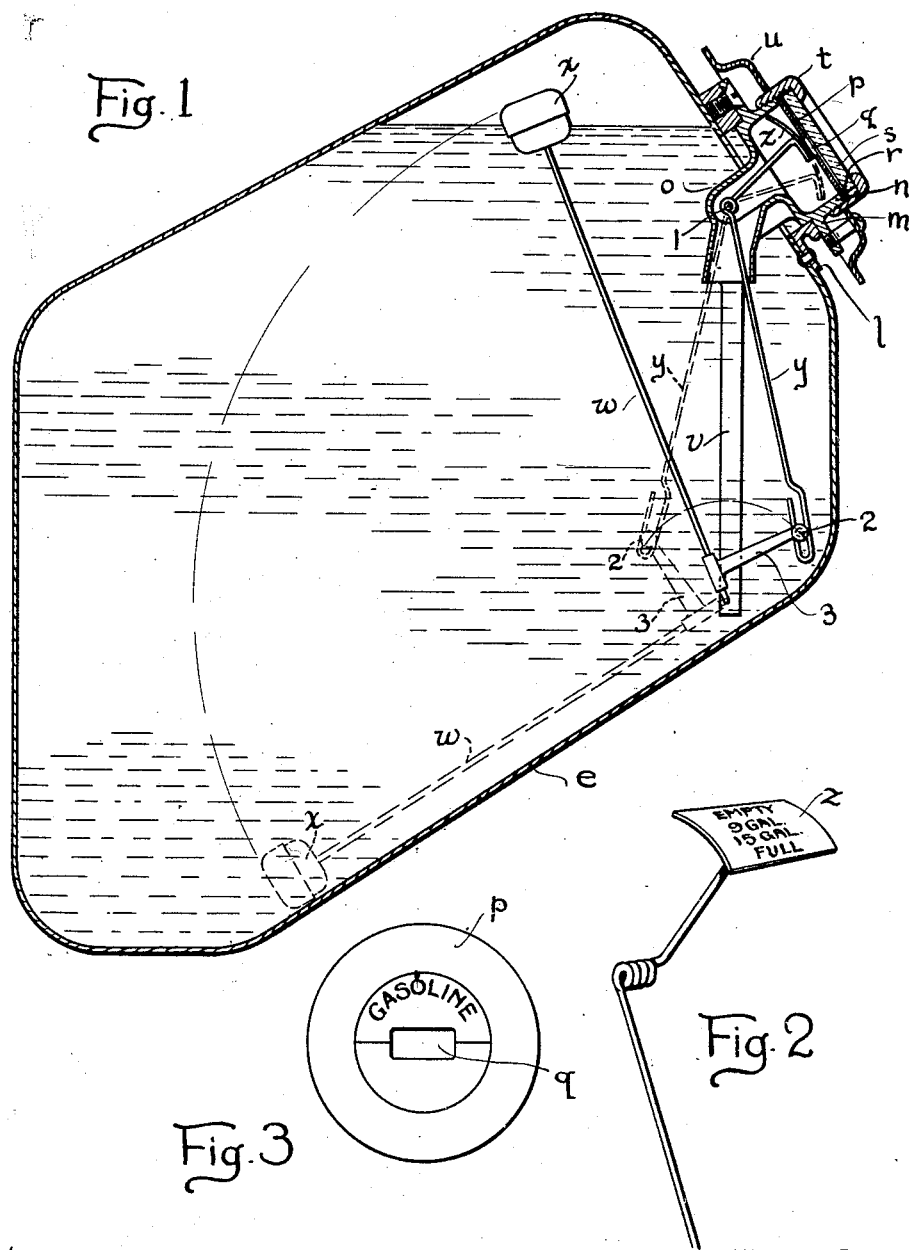
WITNESSES
INVENTOR
Charles Ogro Egerton
BY
Raymond A. Parker
ATTORNEY

C. O. EGERTON.
GASOLENE GAGE.
APPLICATION FILED JAN. 8, 1914.

1,109,669.

Patented Sept. 8, 1914.
2 SHEETS—SHEET 2.

WITNESSES
Robert P. Van Roberts
Virginia C. Spratt.

INVENTOR
Charles Ogro Egerton
BY
Ralzemond A. Parker.
ATTORNEY

UNITED STATES PATENT OFFICE.

CHARLES OZRO EGERTON, OF DETROIT, MICHIGAN, ASSIGNOR TO HUDSON MOTOR CAR COMPANY, OF DETROIT, MICHIGAN, A CORPORATION OF MICHIGAN.

GASOLENE-GAGE.

1,109,669.　　　　Specification of Letters Patent.　　Patented Sept. 8, 1914.

Application filed January 8, 1914. Serial No. 810,952.

*To all whom it may concern:*

Be it known that I, CHARLES OZRO EGERTON, a citizen of the United States, residing at Detroit, county of Wayne, State of Michigan, have invented a certain new and useful Improvement in Gasolene-Gages, and declare the following to be a full, clear, and exact description of the same, such as will enable others skilled in the art to which it pertains to make and use the same, reference being had to the accompanying drawings, which form a part of this specification.

This invention relates to gasolene and has for its object a gasolene gage operated by a float to cause an indicator to swing across a sight opening. Its simplicity of construction and its utility will more fully appear in the description following.

Figure 4:
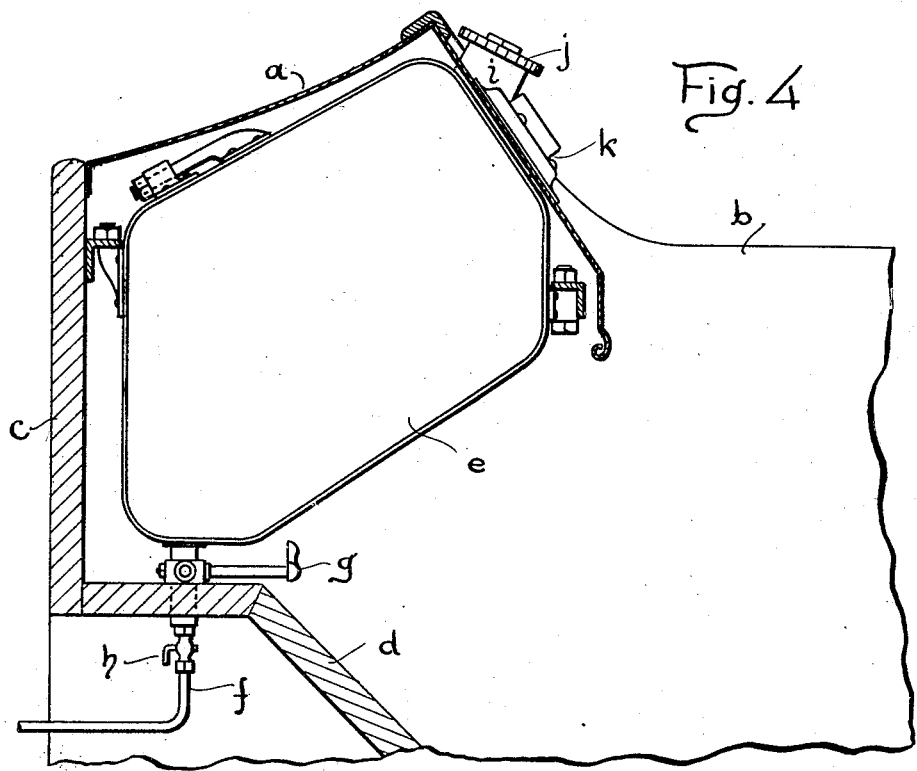
Figure 5:
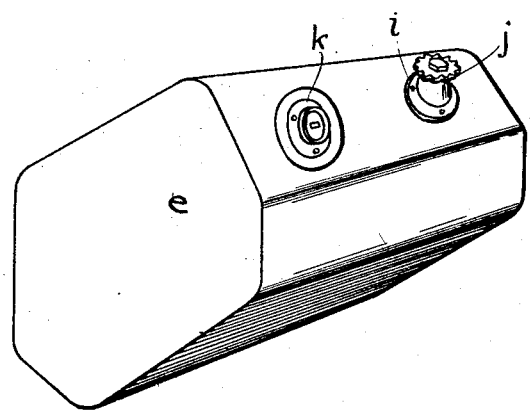

In the drawings: Figure 1, is a sectional view of the gasolene tank and the gage. Fig. 2, is a detail in perspective of the indicator. Fig. 3, is a view of the cap that fits over the gage casing showing the sight opening. Fig. 4, is a sectional view through the dash, the shroud and a part of the floor, showing a sectional view of the tank. Fig. 5, is a perspective of the tank.

In the drawings the tank is shown mounted in front of the driver and under the shroud. As far as my invention is concerned it may be used regardless of the location of the tank. However, it is better to have the tank mounted near the dash so that the sight opening of the gage may be seen by the driver of the car.

$a$ indicates the shroud and $b$ the side of the body.

$c$ designates the dash and $d$ the floor of the car.

The gasolene tank $e$ I have shown polygonal in cross-section, although it is not necessary that it be of any particular shape. A conduit $f$ leads from the gasolene tank through the floor of the car to the engine (not shown). It may be controlled by a valve $g$ that may be reached by the driver. A cock $h$ just under the floor serves as another control. On the upper inclined side are located the filling opening $i$, closed by the cap $j$ and the casing $k$ of the gage. A ring $l$ is riveted onto the tank surrounding an opening in the side of the tank. To this is screwed the body $m$ of the gage. This comprises a flange by which it may be screwed to the ring and a threaded tubular portion $n$ and a sheath $o$. Care is taken in the joints between the ring and the flange to make them tight enough to be air tight. If necessary packing may be used. A gage-plate $p$, provided with a sight opening $q$ fits against the end of the tubular portion $n$. A cork gasket $r$ is placed over this and over this gasket the gage glass $s$ is placed. A screw-threaded cap $t$ has turned over edges that will hold the glass. This cap screws onto the tubular portion $n$ and by reason of the cork gasket secures an air tight fit when the parts are tightly screwed together. A pressed steel ring $u$ fits around the cap $t$ and over the flange of the body of the gage. It is screwed to the flange. This serves to conceal the parts beneath.

The body of the gage is provided with a depending strap $v$ to which is pivoted the stem $w$ of the float $x$. Within the sheath part $o$ of the body is pivoted the stem $y$ of the indicator $z$. The stem $y$ is coiled as shown in Fig. 2 to engage about the pin 1. The indicator plate is a convex plate which may be lettered as shown in Fig. 2 or in any other desired manner. This plate is attached to the indicator stem $y$. The indicator stem at its lower end is bent to form a hook which affords a seat in which the pin 2 carried on the arm 3 is adapted to slide. The arm 3 is attached to the end of the float stem $w$. Hence when the float moves the pin 2 slides in the slot at the end of the stem $y$. This action changes the angular position of the stem $y$ and causes a corresponding change of the position of the indicator plate $t$ with respect to the sight opening $q$. In the dotted line showing of Fig. 1 it will be seen that the float can drop from practically the top to almost the bottom of the tank, causing a corresponding change of the plate $p$ but through a very much smaller arc. However the indications are accurate. The float will not reach completely to the bottom before it indicates "Empty," so as to warn the driver that it is time to replenish his tank, before the tank is entirely exhausted. In view of the fact that the joints about the gage casing are air tight when the tank is filled the air will be trapped in the casing and hence the fluid will not enter up in the casing so as in any way to interfere with the operation of the indicator.

What I claim is:

1. A liquid gage, having in combination with a tank, a ring riveted thereto, a gage body comprising a flanged portion that is detachably secured to the ring in an air-tight fit, a threaded tubular portion, and a complete sheath extending downward into the tank and open only at the lower end, a packing gasket at the end of the tubular portion, a glass overlying the gasket, a cap screwing onto the tubular portion and adapted to hold the glass in and pack the same against the gasket to form an air-tight fit, and an indicator member partially in said body of the gage casing and arranged to swing on an axis transverse of the body, and means within the tank for operating the indicator member.

A liquid gage, having in combination with a tank, a gage body secured thereto in air-tight relation and comprising a tubular threaded portion, an annular flange by which the same is secured to the tank, and a complete sheath extending downward into the tank and open only at its lower end, a plate provided with a sight opening placed against the end of the tubular portion, a glass overlying the said plate, a cap for holding the glass to the plate and screwing into the threads of the tubular portion, an indicator plate adapted to swing across the sight opening on an axis transverse of the gage body, and means within the tank for operating the indicator plate in accordance with the liquid level.

3. A liquid gage, having in combination with a tank, a body secured to the tank in air-tight relation and having closed sides extending downward into the liquid space of the tank to form an air trap, a transparent member having an air-tight fit with the upper end of the body, and indicator means partially located in the air trap chamber and passing out of the opening in the body at or near the lower end, the said indicator means being arranged to swing on an axis transverse of the gage body.

In testimony whereof, I sign this specification in the presence of two witnesses.

CHARLES OZRO EGERTON.

Witnesses:
 AGNES M. HIPKINS,
 ELLIOTT J. STODDARD.

---

Copies of this patent may be obtained for five cents each, by addressing the "Commissioner of Patents, Washington, D. C."